United States Patent
Lentz et al.

(10) Patent No.: US 12,020,349 B2
(45) Date of Patent: Jun. 25, 2024

(54) METHODS AND APPARATUS FOR EFFICIENT BLENDING IN A GRAPHICS PIPELINE

(71) Applicant: Samsung Electronics Co., Ltd., Suwon-si (KR)

(72) Inventors: Derek J. Lentz, Reno, NV (US); David Tannenbaum, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 232 days.

(21) Appl. No.: 17/029,016

(22) Filed: Sep. 22, 2020

(65) Prior Publication Data
US 2021/0343052 A1 Nov. 4, 2021

Related U.S. Application Data (60) Provisional application No. 63/019,237, filed on May 1, 2020.

(51) Int. Cl.
| | | |
|---|---|---|
| G06T 11/00 | (2006.01) | |
| G06F 7/523 | (2006.01) | |
| G06F 9/48 | (2006.01) | |
| G06T 1/20 | (2006.01) | |

(52) U.S. Cl.
CPC ............ *G06T 11/001* (2013.01); *G06F 7/523* (2013.01); *G06F 9/48* (2013.01); *G06T 1/20* (2013.01)

(58) Field of Classification Search
CPC ........... G06T 11/001; G06F 7/523; G06F 9/48
See application file for complete search history.

(56) References Cited

U.S. PATENT DOCUMENTS

| | | | | |
|---|---|---|---|---|
| 5,870,102 | A * | 2/1999 | Tarolli | G06T 15/04 345/586 |
| 5,983,328 | A * | 11/1999 | Potts | G06F 13/1647 711/150 |
| 6,339,432 | B1 * | 1/2002 | Grossman | G09G 5/393 345/639 |
| 6,963,342 | B2 | 11/2005 | Pascual et al. | |
| 7,034,828 | B1 | 4/2006 | Drebin et al. | |

(Continued)

OTHER PUBLICATIONS

Tech Delight "Multiply 16-bit integers using 8-bit multiplier" Sep. 3, 2017. (Year: 2017).*

*Primary Examiner* — Sing-Wai Wu
*Assistant Examiner* — Khoa Vu
(74) *Attorney, Agent, or Firm* — Renaissance IP Law Group LLP (57) ABSTRACT

A method for performing a blending operation in a graphics processing unit may include multiplying a first value and a first blend factor for a component of a render target with a first multiply operation of a multiplier, multiplying a second value and a second blend factor for the component of the render target with a second multiply operation of the multiplier, and adding a first result of the first multiply operation and a second result of the second multiply operation. The method may further include bypassing the multiplier for a first blend factor of substantially zero. The method may further include, for a blend factor of substantially one: bypassing the multiplier, and providing the first value of the component of the render target as a result of the first multiply operation.

18 Claims, 8 Drawing Sheets

(56) References Cited

U.S. PATENT DOCUMENTS

| | | | |
|---|---|---|---|
| 7,505,046 B1* | 3/2009 | Louveaux | G06T 15/503 |
| | | | 345/592 |
| 7,777,749 B2 | 8/2010 | Chung et al. | |
| 8,854,381 B2 | 10/2014 | Mantor et al. | |
| 9,183,609 B2 | 11/2015 | Bastos et al. | |
| 9,202,308 B2 | 12/2015 | Keramidas et al. | |
| 2006/0192788 A1* | 8/2006 | Stollnitz | G06T 15/503 |
| | | | 345/592 |
| 2007/0057972 A1* | 3/2007 | Krasnopolsky | G06T 15/503 |
| | | | 345/629 |
| 2008/0094410 A1* | 4/2008 | Jiao | G06T 15/503 |
| | | | 345/592 |
| 2009/0150654 A1* | 6/2009 | Oberman | G06F 9/30014 |
| | | | 712/221 |
| 2015/0138226 A1* | 5/2015 | Toth | G06T 15/005 |
| | | | 345/595 |
| 2016/0303479 A1 | 10/2016 | Cotter | |
| 2018/0121391 A1* | 5/2018 | Beri | G06T 11/40 |
| 2018/0308272 A1* | 10/2018 | Appu | G06F 1/3287 |
| 2020/0050451 A1 | 2/2020 | Babich et al. | |
| 2020/0051309 A1 | 2/2020 | Labbe et al. | |

* cited by examiner

METHODS AND APPARATUS FOR EFFICIENT BLENDING IN A GRAPHICS PIPELINE

CROSS-REFERENCE TO RELATED APPLICATION

This application claims priority to, and the benefit of, U.S. Provisional Patent Application Ser. No. 63/019,237 titled "Methods and Apparatus for Efficient Graphics Blending" filed May 1, 2020 which is incorporated by reference.

TECHNICAL FIELD

This disclosure relates generally to graphics processing, and more specifically to methods and apparatus for efficient blending in a graphics pipeline.

BACKGROUND

A pipeline for a graphics processing unit (GPU) may include a blending unit to enable a programmer or application to implement a wide variety of effects. For example, a blending unit may enable the color values of pixels stored in a frame buffer to be blended with the color values of incoming pixels from a pixel shader to provide a transparency effect.

The above information disclosed in this Background section is only for enhancement of understanding of the background of the invention and therefore it may contain information that does not constitute prior art.

SUMMARY

A method of processing in a graphics processing unit may include receiving a first value and a first blend factor for a component of a render target, receiving a second value and a second blend factor for the component of the render target, and performing a blending operation that may include multiplying the first value and the first blend factor with a first multiply operation of a multiplier, multiplying the second value and the second blend factor with a second multiply operation of the multiplier, and adding a first result of the first multiply operation and a second result of the second multiply operation. The method may further include bypassing the multiplier for a first blend factor of substantially zero. The method may further include bypassing the multiplier for a second blend factor of substantially zero. The method may further include, for a blend factor of substantially one: bypassing the multiplier, and providing the first value of the component of the render target as a result of the first multiply operation. The first result of the first multiply operation may be added to the second result of the second multiply operation through a feedback path. The multiplier may be a first multiplier of a first data path having a first data format, the component of the render target may be a first component of a first render target, and the method may further include multiplying a third value and a third blend factor for a second component of a second render target with a second multiplier of a second data path having a second data format. The method may further include directing the first value and the first blend factor to the first multiplier through a staging register, and directing the third value and the third blend factor to the second multiplier through the staging register. The first data format may include a normalized integer format, and the second data format may include a floating point format.

A graphics processing unit may include a multiplier, an input staging register configured to direct a first value and a first blend factor for a component of a render target to the multiplier for a first multiply operation and a second value and a second blend factor for the component of the render target to the multiplier for a second multiply operation, and an adder configured to add a first result of the first multiply operation and a second result of the second multiply operation. The input staging register may be configured to bypass the multiplier for a first blend factor of substantially zero. The input staging register may be configured to bypass the multiplier for a second blend factor of substantially zero. The input staging register may be configured to bypass the multiplier and provide the first value of the component of the render target as a result of the first multiply operation for a first blend factor of substantially one. The input staging register may be configured to bypass the multiplier and provide the second value of the component of the render target as the second result of the second multiply operation for a second blend factor of substantially one. The first result of the first multiply operation may be applied to the adder through a feedback path. The graphics processing unit may further include an output staging register configured to direct an output of the adder to a buffer.

A graphics processing unit may include a blending unit including blending logic having a first mode and a second mode, and an input staging register configured to direct first data having a first format with a first width to the blending unit in the first mode, and to direct second data having a second format with a second width to the blending unit in the second mode, wherein the second width may be substantially larger than the first width, wherein the blending logic may be configured to blend the first data at a first throughput in the first mode, and to blend the second data at a second throughput that is substantially lower than the first throughput in the second mode. The first and second formats may include unorm, and the blending logic may include a layer of multipliers arranged to multiply pairs of the first data, a layer of first adders arranged to combine outputs from pairs of the multipliers to provide first blended outputs having the first width at the first throughput, and a second adder arranged to combine outputs from the layer of multipliers to provide a second blended output having the second width at the second throughput. The first and second formats may include floating point, and the blending logic may include a multiply-add module, and a multiplexer configured to direct floating point data having the first width or floating point data having the second width to a multiply input of the multiply-add module. The multiply-add module may be configured to perform two floating point multiply-add operations at the first width or one floating point multiply-add operation at the second width in the same number of cycles. The graphics processing unit may further include a feedback path configured to direct a result output from the multiply-add module to an add input of the multiply-add module.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments disclosed herein. The figures do not describe every aspect of the teachings disclosed herein and do not limit the scope of the claims. The accompanying drawings, together with the specification, illustrate example embodiments of the present

DETAILED DESCRIPTION

Overview

This disclosure encompasses numerous inventive principles relating to shared resources for blending operations in a graphics pipeline. These principles may have independent utility and may be embodied individually, and not every embodiment may utilize every principle. Moreover, the principles may also be embodied in various combinations, some of which may amplify the benefits of the individual principles in a synergistic manner.

Some of the principles involve the use of one or more time-shared resources for blending operations. For example, in some embodiments, one multiplier may perform two multiplications sequentially—one for a source blend factor and one for a destination blend factor—for a single component of a render target.

Some additional principles involve sharing resources based on data formats. For example, in some embodiments, in a first mode of operation, a given number of multipliers may be configured to perform four blend factor multiplications per clock cycle for components having an 8-bit unsigned normalized integer (unorm8) format. In a second mode of operation, however, the same number of multipliers may be configured to perform one blend factor multiplication per clock cycle for components having a 16-bit normalized integer (unorm16) format.

Some additional principles involve selectively bypassing multiplier operations in response to conditions such as a blending operation that does not specify any multiplication operations, and/or a blend factor, source data, and/or destination data being zero or one. For example, even if a blending operation specifies multiplying a source blend factor by source data, if the source blend factor is one, the multiplication operation may be omitted and the value of the source data may be used as the result.

Some additional principles involve the use of one or more staging structures to synchronize the flow of data through a blending unit. For example, in some embodiments, one or more input staging registers may be arranged before a blending unit to direct component data and/or blend factors for a variety of render targets, each of which may have different blend operations, numbers of components, data formats, and/or the like, to one or more data paths having computational structures that, in turn, may accommodate different data formats, numbers of components, numbers of render targets, and/or the like. The one or more input staging registers may schedule operations, for example, to reduce or eliminate blocking of some operations by other operations, prevent overwriting of data for some render target components by data from other render target components, and/or the like.

In some embodiments, one or more output staging registers may be arranged after a blending unit to redirect one or more results back to the blending unit, for example, in a multi-pass situation in which one multiplier may perform sequential multiplication operations for a component of a render target. In some embodiments, one or more output staging registers may also schedule and/or direct outputs from computational structures in the blending unit to one or more downstream structure such as a tile buffer, a frame buffer, and/or the like.

In some embodiments, and depending on the implementation details, the principles described above and throughout this disclosure may enable the area cost and/or power consumption of a blending unit to be reduced by enhancing and/or optimizing blending logic for more common cases while still implementing functionality for less common cases. Moreover, any reduction in the area cost and/or power consumption of blending logic as described herein may be multiplied in a physical implementation in which multiple instances of the blending logic may be included.

Blending Operations

In some embodiments, blending may be implemented according to the following equation:

$$C_F = BF_S C_S + BF_D C_D \qquad (\text{Eq. 1})$$

where $C_F$ may represent the final computed value of a component (e.g., a color). $C_S$ may represent the value of a source component, $C_D$ may represent the value of a destination component, $BF_S$ may represent the value of a source blend factor, and $BF_D$ may represent the value of a destination blend factor. Thus, in some embodiments, the final computed value of the component $C_F$ may be a weighted sum of the source and destination components $C_S$ and $C_D$, where the source and destination blend factors $BF_S$ and $BF_D$ may function as coefficients that determine the relative amounts of the source and destination components $C_S$ and $C_D$, respectively. In some embodiments, however, blending may implemented using a wide variety of different blend factors and/or blending equations of which Eq. 1 is just one example.

Figure 1:
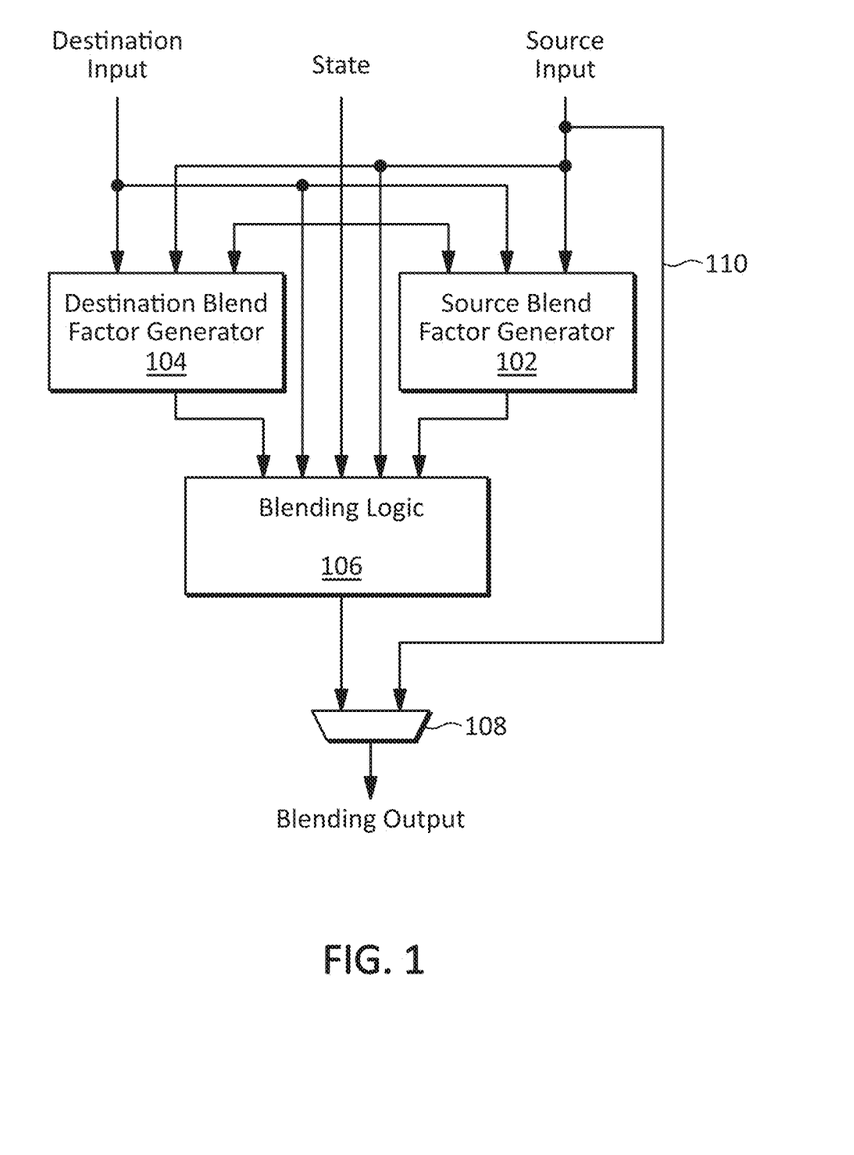
FIG. 1 illustrates an embodiment of a blending unit for a GPU according to this disclosure.

FIG. 1 illustrates an embodiment of a blending unit for a GPU according to this disclosure. The blending unit illustrated in FIG. 1 may be used, for example, to implement a wide variety of blend factors and/or blending equations including the example of Eq. 1. The blending unit may include a source blend factor generator 102, a destination blend factor generator 104, and blending logic 106. Each of the blend factor generators 102 and 104 may receive source data from a source apparatus, for example, a shader such as a pixel or fragment shader. Each of the blend factor generators 102 and 104 may also receive destination data from a destination apparatus, for example, a buffer such as a tile buffer or frame buffer. The blend factor generators 102 and 104 may also receive one or more state inputs (State) as explained in more detail below, for example, from an application or programmer through an application programming interface (API).

The source and destination blend factor generators 102 and 104 may generate a source blend factor and a destination blend factor respectively, by combining the source and destination data in a manner that may be specified by the one or more State inputs. For example, in some embodiments, the source and destination blend factor generators 102 and 104 may generate the source and destination blend factors as shown in Table 1 and described in more detail below.

The blending logic 106 may receive the source and destination data as well as the source and destination blend factors and generate a final blending output by combining the inputs according to a blending function that may be specified by the one or more State inputs. For example, in some embodiments, the blending logic 106 may combine the inputs according to one or more of the functions shown in Table 2 and described in more detail below.

In some embodiments, the blending unit may also include a multiplexer 108 to provide the final blending output by selecting between the output of the blending logic 106 and a blending bypass path 110.

For purposes of illustrating the principles of this disclosure, some embodiments of blending methods and/or apparatus may be described in the context of systems in which a render target such as a pixel may have four scalar components, for example, red, green, and blue color channels, and an alpha transparency channel. The principles, however, are not limited to these implementation details. For example, a render target may be implemented with different numbers of components which may represent any attributes, for example, components of a vector such as a normal vector, scalars that may represent depth and/or other distance values, albedo and/or other reflective attributes, and/or any other type of data that may be processed by a GPU. As a further example, a render target may refer to any collection of one or more components such as subpixels in a multi-sample anti-aliasing (MSAA) implementation or variable rate shading apparatus. Moreover, some embodiments may include blending apparatus to accommodate multiple render targets. For example, some embodiments may include blending apparatus configured to blend four components per pixel with four render targets and a depth buffer. As another example, some embodiments may include blending apparatus configured to blend four components per pixel with eight render targets and a depth buffer. Other embodiments may be configured for different numbers of components per pixel, as well as different numbers of render targets, buffers, and/or the like.

In some embodiments, blending methods and/or apparatus according to this disclosure may be used to implement a standard graphics API such as OpenGL, OpenGL Embedded Systems (OpenGL ES). Direct-X (DX). Vulkan, and/or the like. For purposes of illustrating the principles of this disclosure, some embodiments of blending methods and/or apparatus may be described in the context of systems that may implement an OpenGL and/or Vulkan API. The principles, however, are not limited to systems that implement any standard or non-standard API.

Table 1 provides some example embodiments of blend factors that may be generated by a blend factor generator according to this disclosure. For purposes of illustration, some of the blend factors may be described in the context of terminology used by the OpenGL API, but the same or similar factors may be implemented with any other standard and/or nonstandard API.

Referring to Table 1, some of the elements may be described as follows. Dst.X may refer to destination data (e.g., read from a tile buffer, frame buffer, and/or the like). Src.X may refer to source color data (e.g., supplied by a shader such as a pixel shader). BlendColorAlpha may refer to an alpha component of a BlendColor programmed through an API. BlendColor_C may refer to the C color component of the BlendColor (e.g., C may be red for a red component, green for a green component, or blue for a blue component.) Dst.C and Src.C may refer to a specific color channel destination or source color value (e.g., red, green, or blue) being used. Dst.A and Src.A may refer to the destination alpha component and source alpha component, respectively. For example, a red channel may use Dst.A, Src.A, Dst.R and/or Src.R color values for blending. As mentioned above, however, in some embodiments, the C and A components may be implemented with any type of data that may be processed in a GPU.

TABLE 1

| Code | Name | Color Blend Factor | Alpha Blend Factor |
|---|---|---|---|
| 0 | BLEND_ZERO | 0.0 | 0.0 |
| 1 | BLEND_ONE | 1.0 | 1.0 |
| 0 | BLEND_SRC_COLOR | Src.C | Src.A |
| 3 | BLEND_ONE_MINUS_SRC_COLOR | 1.0 − Src.C | 1.0 − Src.A |
| 4 | BLEND_DEST_COLOR | Dst.C | Dst.A |
| 5 | BLEND_ONE_MINUS_DEST_COLOR | 1.0 − Dst.C | 1.0 − Dst.A |
| 6 | BLEND_SRC_ALPHA | Src.A | Src.A |
| 7 | BLEND_ONE_MINUS_SRC_ALPHA | 1.0 − Src.A | 1.0 − Src.A |
| 8 | BLEND_DEST_ALPHA | Dst.A | Dst.A |
| 9 | BLEND_ONE_MINUS_DEST_ALPHA | 1.0 − Dst.A | 1.0 − Dst.A |
| 10 | BLEND_CONST_COLOR | BlendColor_C | BlendColorAlpha |
| 11 | BLEND_ONE_MINUS_CONST_COLOR | 1.0 − BlendColor_C | 1.0 − BlendColorAlpha |
| 12 | BLEND_CONST_ALPHA | BlendColorAlpha | BlendColorAlpha |
| 13 | BLEND_ONE_MINUS_CONST_ALPHA | 1.0 − BlendColorAlpha | 1.0 − BlendColorAlpha |
| 14 | BLEND_SRC_ALPHA_SAT | min(Src.A, (1.0 − Dst.A)) | 1.0 |

Figure 2:
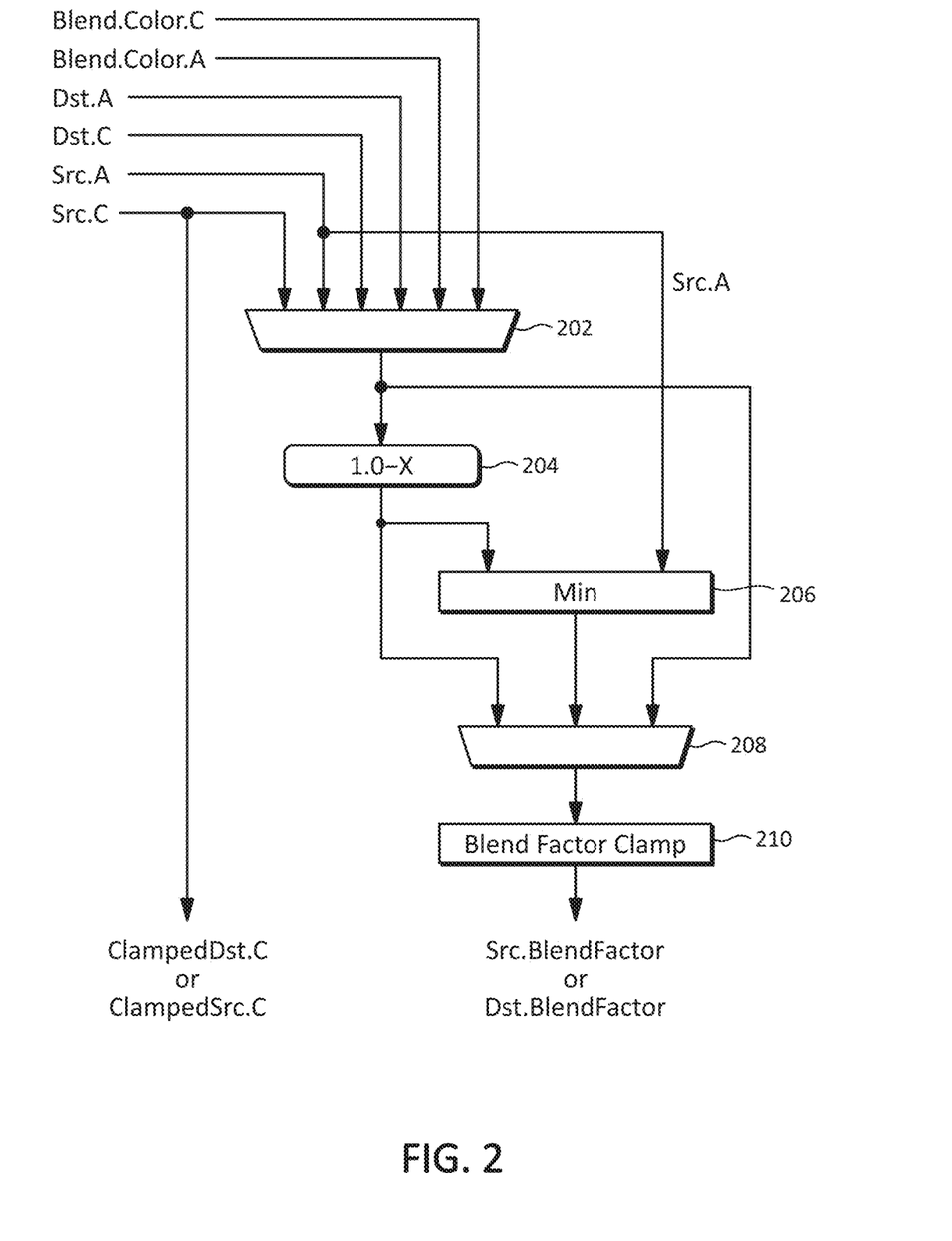
FIG. 2 illustrates an embodiment of a blend factor generator according to this disclosure.

FIG. 2 illustrates an embodiment of a blend factor generator according to this disclosure. The blend factor generator illustrated in FIG. 2 may be used, for example, to implement one or both of the blend factor generators 102 and 104 illustrated in FIG. 1, and to generate one or more of the blend factors listed in Table 1.

Referring to FIG. 2, the blend factor generator may include an input multiplexer 202, a 1-X unit 204, a minimum value unit 206, an output multiplexer 208, and a clamp unit 210. The input multiplexer 202 may select between input values as described above with respect to Table 1. In some embodiments, support for multiple-source blending (e.g., dual-source blending) may be implemented by adding more inputs to the input multiplexer 202.

The 1-X unit 204 may calculate one minus the input value to implement any of the 1-X factors in Table 1, where X may be any value applied to the unit 204. The minimum value unit 206 may determine the minimum value of the output of the 1-X unit 204 and the source alpha component for purposes of determining the source alpha saturation (code 14) as shown in Table 1. The output multiplexer 208 may select one of the output of the 1-X unit 204, the minimum value unit 206, or the value selected by the input multiplexer 202. The final blend factor output may be clamped by the clamp unit 210. The input multiplexer 202 and/or output multiplexer 208 may operate, for example, in response to one or more state fields (State) as explained in more detail below, which may be accessed through an API.

Table 2 provides some example embodiments of blending operations (e.g., equations) that may be generated by a blend factor generator according to this disclosure. For purposes of illustration, some of the blend factors may be described in the context of terminology used by the OpenGL API, but the same or similar factors may be implemented with any other standard and/or nonstandard API.

Referring to Table 2, some of the elements may be described as follows. Src.BlendFactor may refer to the result of the computation of the Blend Factor specified for the source data. Dst.BlendFactor may refer to the result of the computation of the Blend Factor for the destination data. In some embodiments, C may refer to the destination or source color channel value (e.g., red, green, or blue), but in other embodiments, C may refer to any type of data that may be processed in a GPU.

TABLE 2

| Code | Name | Function |
|---|---|---|
| 1 | BLEND_OP_ADD | (src0 * Src.BlendFactor.C) + (dst * Dst.BlendFactor.C) |
| 2 | BLEND_OP_SUBTRACT | (src0 * Src.BlendFactor.C) − (dst * Dst.BlendFactor.C) |
| 3 | BLEND_OP_REV_SUBTRACT | (dst * Dst.BlendFactor.C) − (src0 * Src.BlendFactor.C) |
| 4 | BLEND_OP_MIN | fmin(src0, dst) |
| 5 | BLEND_OP_MAX | fmax(src0, dst) |

Figure 3:
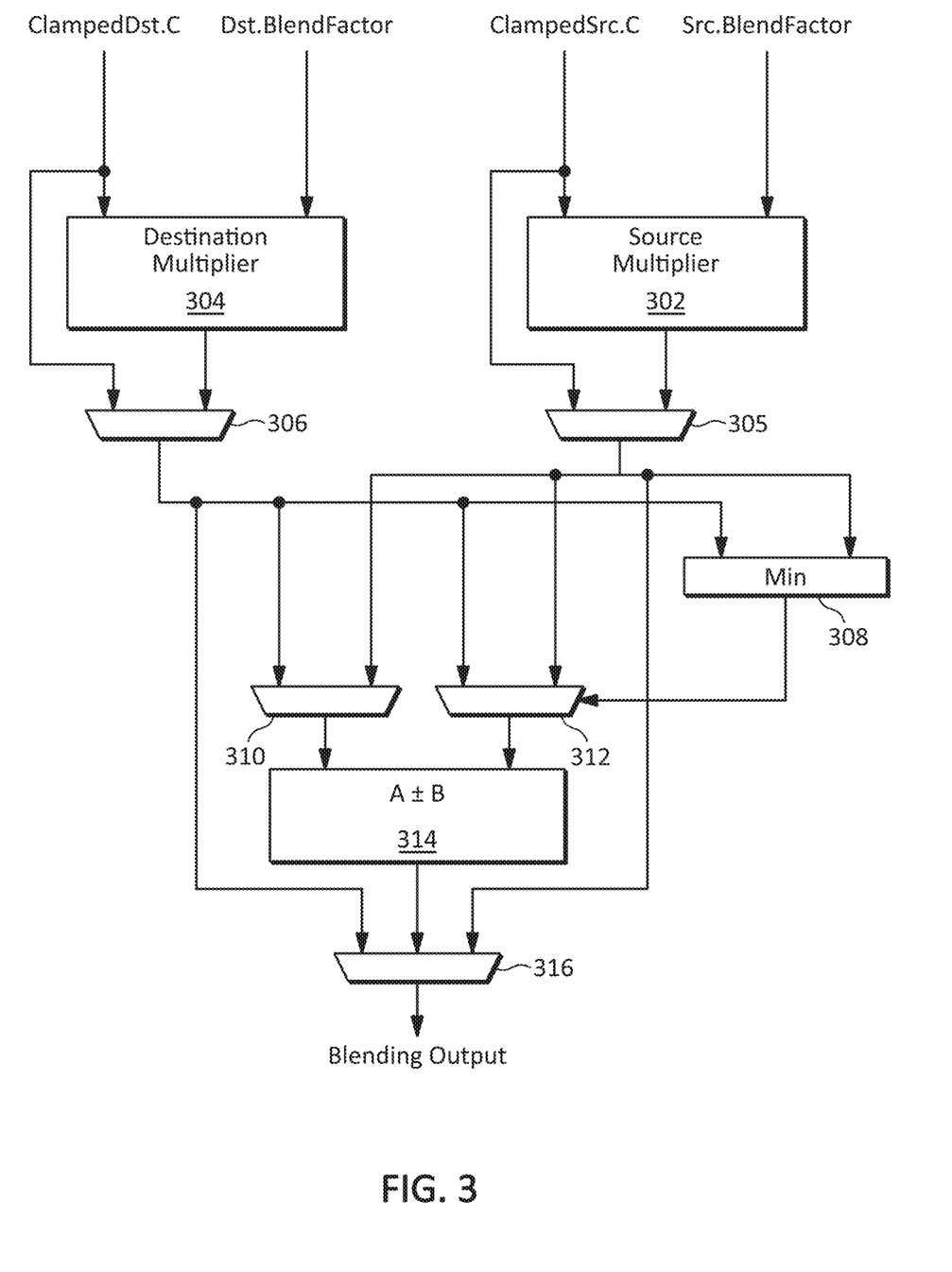
FIG. 3 illustrates an embodiment of blending logic according to this disclosure.

FIG. 3 illustrates an embodiment of blending logic according to this disclosure. The blending logic illustrated in FIG. 3 may be used, for example, to implement the blending logic 106 illustrated in FIG. 1, and one or more of the blend operations listed in Table 2.

Referring to FIG. 3, the blending logic may include a source multiplier 302, a destination multiplier 304, a source multiplexer 305, a destination multiplexer 306, a minimum value unit 308, pre-adder multiplexers 310 and 312, and adder 314, and an output multiplexer 316. The multiplexers 305, 306, 310, 312, and/or 316 may operate, for example, in response to one or more state fields (State) such as one or more image state fields, one or more graphics state fields, and/or the like, which may be accessed through an API, as well as any other signals illustrated in FIG. 3. For example, in some embodiments, an image state field may configure the blending logic for operation at an image granularity such as number of render targets, number of, and/or format of, components of a render target, and/or the like. A graphics state field may configure the blending logic for operation at a graphics level of granularity (e.g., finer granularity at a draw call level) such as the current blending operation (e.g., controls for Tables 1 and 2).

The source and destination multipliers 302 and 304 may receive source and destination component data and blend factor data, respectively, for example, for the outputs of one or more blend factor generators such as those illustrated in FIG. 2. The source multiplexer 305 may select between the output of the source multiplier 302 and source data that may bypass the source multiplier 302. The destination multiplexer 306 may select between the output of the destination multiplier 304 and destination data that may bypass the destination multiplier 304. The pre-adder multiplexers 310 and 312 may select between the outputs of the source and destination multiplexers 305 and 306 as the inputs to the adder 314. The minimum value unit 308 may determine the minimum value of the outputs from the source and destination multiplexers 305 and 306, for example, to implement one of the fmin and/or fmax functions as shown in Table 2 by controlling multiplexer 312.

Physical Implementation

In some embodiments, the arrangements illustrated in FIGS. 1-3 may represent logical implementations of blending units and/or portions thereof. However, the structure and/or operation of a physical implementation may strongly effect the cost, operating speed, area efficiency, power efficiency, and/or other performance attributes of a GPU having a blending unit according to this disclosure.

Some of the inventive principles of this disclosure are based on the recognition that, in some applications, some blending operations may occur less frequently than others. Thus, in some embodiments, by enhancing or optimizing hardware for more common blending cases, the power consumption and/or hardware area of a blending unit may be reduced without effecting the operating speed for the more common blending case, while still enabling the blending unit to perform less common blending operations which, in some implementations, may be performed at lower speeds.

For example, in some applications, it may be common for at least one of the two blend factors to be zero or one. But if a blend factor is zero or one, the corresponding multiply operation may be omitted. For a blend factor of zero, the value zero may be provided as the output, whereas, with a blend factor of one, the value of the component may be provided as the output. Thus, a physical implementation having only a single multiplier may be able to handle most blending cases with little or no reduction in throughput. If the source blend factor is zero or one, the multiplier may be used for just the destination computation, thereby saving the power that may have been consumed by the source calculation. If the destination blend factor is zero or one, the multiplier may be used for just the source calculation, thereby saving the power that may have been consumed by the destination calculation. If both blend factors are zero or one, the multiplier may be bypassed entirely for that blend operation, thereby saving the power that may have been consumed by both calculations. In the uncommon case that both the source and destination blend factors are neither zero nor one, the multiplier may perform the two computations sequentially. Although this may reduce the blending throughput for the uncommon cases in which both multiplications may be performed, it may provide acceptable performance or may even be unnoticeable, while enabling the cost, area, and/or power consumption of the physical implementation to be reduced.

As another example, in some applications, operands having smaller bit widths may be more common than operands with larger bit widths. Thus, multipliers and/or other hardware may be implemented with a relatively low bit width data path that may reduce the cost, area, and/or power consumption of the physical implementation. This hardware may be enhanced or optimized to perform lower bit width calculations at full speed in a first mode of operation. The hardware may be reconfigured to operate in a second mode in which it may perform calculations on larger bit width data, albeit at a lower throughput. However, in view of how infrequently larger bit width data may be encountered, such an arrangement may provide acceptable performance or may even be unnoticeable, while enabling the cost, area, and/or power consumption of the physical implementation to be reduced.

Some additional enhancements and/or optimizations according to this disclosure may involve implementing physical data paths based on data formats. For example, a blending unit may have three logical data paths: one for 8-bit data, one for 16-bit data, and one for 32-bit data. However, in some embodiments, these three logical data paths may be implemented with two physical data paths: one physical data path for unorm data, and a second physical data path for floating point data. In some embodiments, and depending on the implementation details, using different data paths for different data formats may enable hardware to be enhanced or optimized for each data format, which, in turn, may enable the cost, area, and/or power consumption of the physical implementation to be reduced.

In some embodiments, some of the principles may be combined to provide further enhancements and/or optimizations. For example, in an embodiment having different data paths for different data formats, one or more of the format-specific data paths may be further optimized for a data having a specific bit width. Thus, in some embodiments, a blending unit may include a unorm data path having hardware that may be enhanced or optimized for smaller width unorm values, and/or a floating point data path having hardware that may be enhanced or optimized for smaller width floating point values.

Some additional inventive principles of this disclosure relate to the use of staging techniques to direct and/or synchronize data flow to blending resources (e.g., blend factor generators and/or blending logic such as multipliers, adders, multiplexers, etc.) based on a wide variety of attributes such as data format (e.g., unorm, floating point, etc.), data bit width (e.g., 8, 10, 11, 16, and/or 32 bit data widths, etc.), data grouping (e.g., number of components within a render target), number of passes through a data path (e.g., if a multiplier may perform sequential multiply operations for a component), and/or the like. In some embodiments, blending may be performed on render targets having different numbers and/or configuration of components, different data formats, different bit widths, and/or the like. The use of staging registers according to this disclosure may enable diverse render targets to be directed to and/or from computation resources that may be enhanced and/or optimized for the specific components, data formats, bit widths, etc., for each component, render target, and/or the like.

Figure 4:
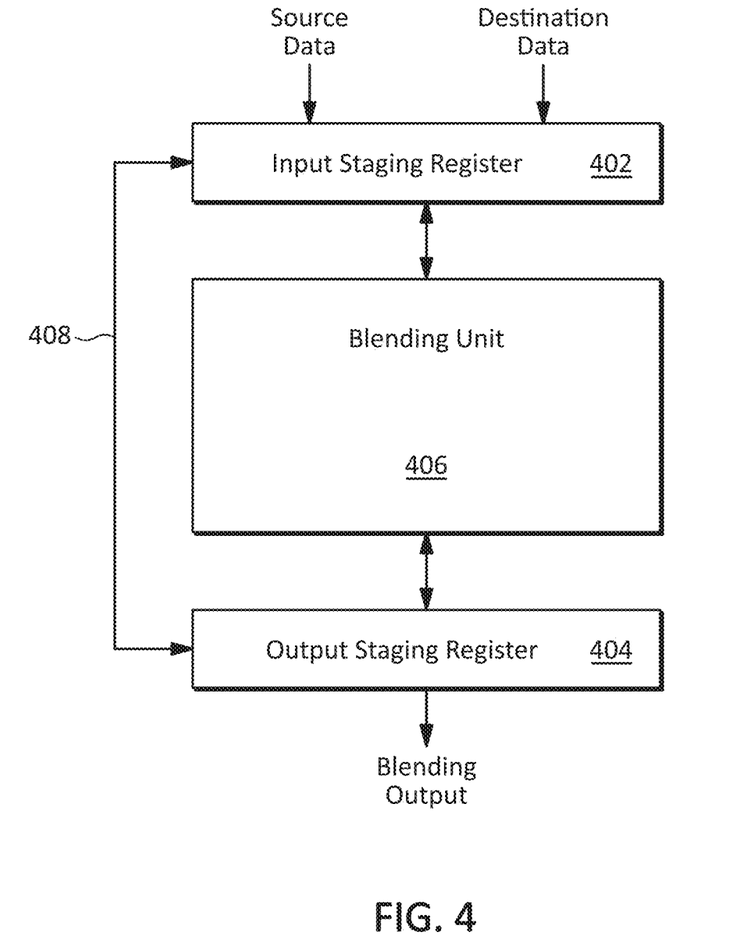
FIG. 4 illustrates an example embodiment of a blending unit with staging registers according to this disclosure.

FIG. 4 illustrates an example embodiment of a blending unit with staging registers according to this disclosure. The embodiment illustrated in FIG. 4 may include an input staging register 402, an output staging register 404, and a blending unit 406. The blending unit 406 may be implemented using any of the blending methods and/or apparatus described in this disclosure. For example, the blending unit 406 may include one or more blending resources such as blend factor generators and/or blending logic which may be implemented with data paths that may be enhanced and/or optimized for render targets with different number of components, data formats, bit widths, and/or the like. In some embodiments, the blending unit 406 may include multiple data paths configured to process data in multiple formats and/or bit widths. For example, the blending unit 406 may include a first data path having blending logic configured to process data in unorm8 and unorm16 format, and a second data path having blending logic configured to process data in 16-bit floating point (FP16) and 32-bit floating point (FP32) format.

In some embodiments, the input staging register 402 may be configured to receive source data from a source apparatus, for example, a shader such as a pixel or fragment shader, and destination data from a destination apparatus, for example, a buffer such as a tile buffer or frame buffer. The input staging register 402 may direct and/or synchronize the source and/or destination data it receives to one or more resources within the blending unit 406. For example, data in unorm format may be directed to one or more blend factor generators and/or blending logic that is configured to operate on unorm data, while data in floating point format may be directed to one or more blend factor generators and/or blending logic that is configured to operate on floating point data. As another example, the input staging register 402 may direct multiple small bit width operands to a hardware structure configured to process multiple small bit width operands in a first mode. After the multiple small operands are processed, the input staging register 402 may then direct a large bit width operand to the hardware structure after it is configured in a second mode to process a large bit width operand.

The input staging register 402 may also attempt to keep the blending unit 406 busy and/or operating at full capacity, for example, by redirecting different components and/or components of different render targets to different blending resources within the blending unit 406.

In some embodiments, the input staging register 402 may also be configured to bypass all, or a portion of, the blending unit 406, for example, though bypass data path 408. Bypassing may be used, for example, for certain combinations of blend factors, component data, and/or graphic states that may not involve calculations by a blend factor generator and/or blending logic. For example, a multiplier may be bypassed when a component value or blend factor is zero or one. This may include cases in which the component value or blend factor is substantially zero or one, for example, if the component value or blend factor is close enough to zero or one that bypassing the multiplier may produce a result that may be unnoticeable or of acceptable quality.

In some embodiments, the input staging register 402 may also be configured to handle data having bit widths that may not align with the bit width of one or more hardware components of the blending unit 406. For example, the input staging register may direct data in 10-bit or 11-bit floating point format (FP10 or FP11) to be processed by hardware configured for 16-bit floating point (FP16) operation, while providing clamping, and/or other constraints to preserve the 10-bit or 11-bit format.

In some embodiments, the output staging register 404 may receive full and/or partial blending outputs from the blending unit 406 and collect, realign, synchronize, redirect, and/or forward them to a destination apparatus such as a tile buffer or frame buffer. For example, the output staging register 404 may gather outputs for components of a render target that were directed to different blending resources and/or were processed on different cycles, and send them together as a single render target to a tile or frame buffer. As another example, the output staging register 404 may receive the output from a first multiply operation for a component that requires two multiply operations and redirect it back to a multiply/add unit to be combined with the results of a second multiply operation for the component. As a further example, the output staging register 404 may receive components that bypassed one or more portions of the blending unit 406 and resynchronize them with other components from the same render target. As yet another example, the output staging register 404 may accumulate output components and/or render targets to forward them together to a tile or frame buffer which may be configured to receive wide write data from the blending unit 406.

Although the input staging register 402 and output staging register 404 are shown as separate components, all or portions of the input staging register 402 and output staging register 404 may be integrated into the blending unit 406, for example, to provide access to signals and/or structures with the blending unit 406.

Figure 5:
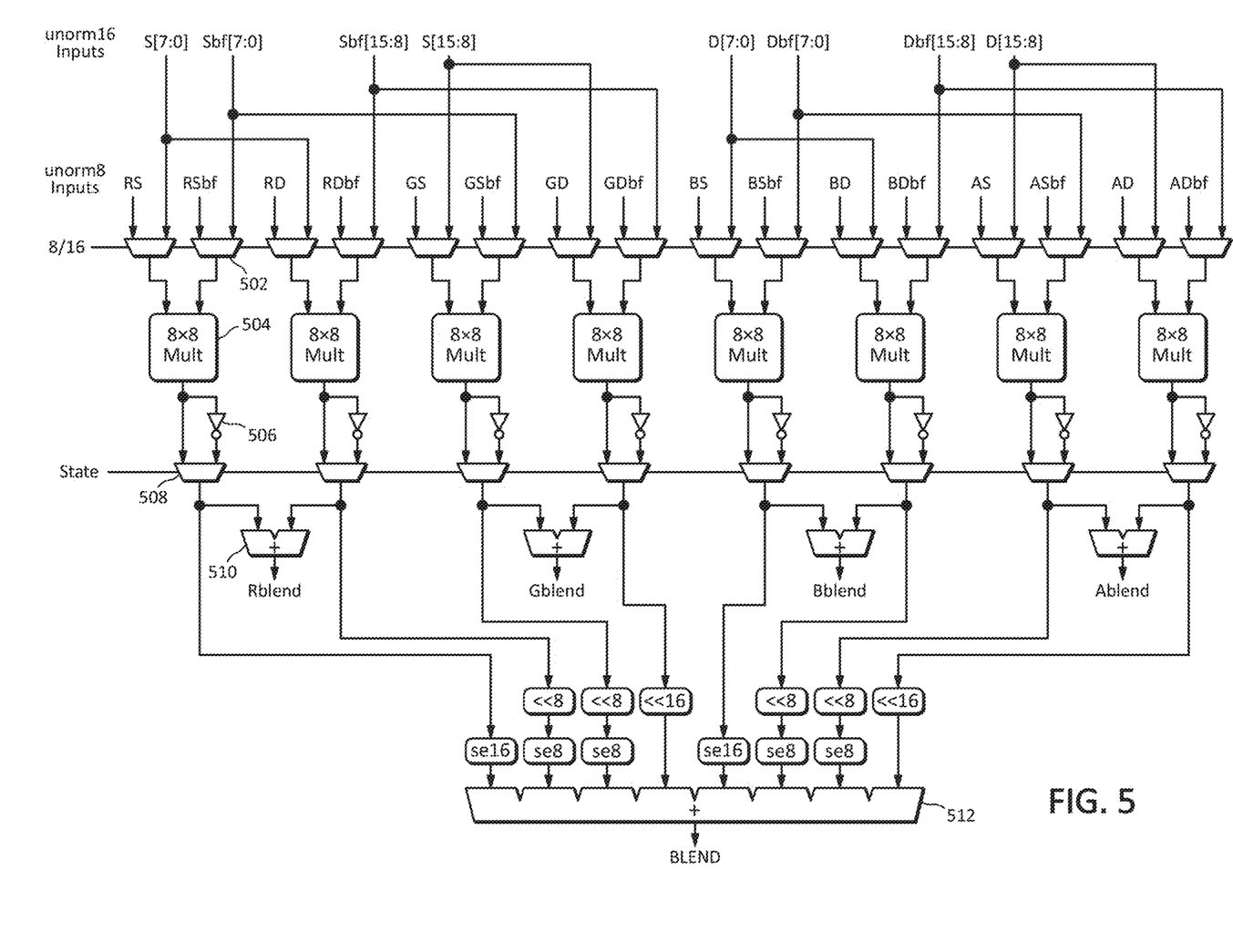
FIG. 5 illustrates an embodiment of blending logic for unorm8 and unorm16 operands according to this disclosure.

FIG. 5 illustrates an embodiment of blending logic for unorm8 and unorm16 operands according to this disclosure. The embodiment illustrated in FIG. 5 may include a layer of sixteen 2:1 multiplexers 502 arranged to select between unorm8 and unorm16 inputs in response to a select signal 8/16.

Inputs for one pixel with four 8-bit components may be applied to the multiplexers 502 where RS, GS, BS, and AS may designate source component inputs, RD. GD, BD, and AD may designate destination component inputs, RSbf, GSbf, BSbf, and ASbf may designate source blend factor inputs, and RDbf, GDbf, BDbf, and ADbf may designate destination blend factor inputs. In some implementations and/or applications, R, G, B, and A may designate red, green, blue, and alpha color channels, respectively, but the embodiment illustrated in FIG. 5 may be used with any type of data, and the R, G, B, and A designators are only provided as a convenience for distinguishing the different components. Moreover, the R, G, B, and A components do not need to be associated with a single pixel or render target. In some implementations and/or applications, the R, G, B, and A components may be associated with any number of render targets, including four different render targets.

Inputs for one 16-bit component may be applied to the multiplexers 502 where S[15:8], and S[7:0] may designate high and low 8-bit portions of a source component input, respectively, D[15:8], and D[7:0] may designate high and low 8-bit portions of a destination component input, respectively. Sbf[15:8], and Sbf[7:0] may designate high and low 8-bit portions of a source blend factor input, respectively, and Dbf[15:8], and Dbf[7:0] may designate high and low 8-bit portions of a destination blend factor input, respectively.

In 8-bit (unorm8) mode, the multiplexers 502 may select the 8-bit inputs which may be applied to a layer of eight 8×8-bit multipliers 504. The 16-bit output from each of the multipliers 504 may be applied directly to a first input of a 2:1 multiplexer 508 and to a second input of the multiplexer 508 through an inverter 506. This may enable the multiplexer to select the direct output of the multiplier 504 or its ones-complement (which may represent 1.0-X, where X is the multiplier output) in response to one or more state signals (State) which may be used to select the blending operation such as those shown in Table 2 for adjacent pairs of multipliers.

The selected outputs from adjacent pairs of multiplexers 508 may be applied to a layer of four adders 510 which may take the 16-bit operands and output the high-order eight bits of the sum to provide the final blended component outputs Rblend, Gblend, Bblend, and Ablend in unorm8 format. (In some implementations, the low-order eight bits of the sum may be used to provide a carry-in signal to the high-order bits.)

In 16-bit (unorm16) mode, the multiplexers 502 may select the high and low portions of the 16-bit inputs which may be applied to the layer of eight 8×8-bit multipliers 504. The operation of the multipliers 504 and inverters 506 may be the same as in 8-bit mode. However, in 16-bit mode, the outputs of all eight multipliers 504 may be applied to an adder 512 through the multiplexers 508 in response to one or more state signals (State) to select the blending operation and provide the final blended output signal BLEND in unorm16 format. Thus, the four multipliers on the left of FIG. 5 may be arranged to produce the 16×16 product of the source component S and the source blending factor Sbf, and the four multipliers on the right of FIG. 5 may be arranged to produce the 16×16 product of the destination component D and the destination blending factor Dbf.

In some embodiments, and depending on the implementation details, the blending logic illustrated in FIG. 5 may blend four 8-bit components per clock cycle in 8-bit (unorm8) mode, whereas, in 16-bit (unorm16) mode, it may blend one 16-bit component per clock cycle.

Figure 6:
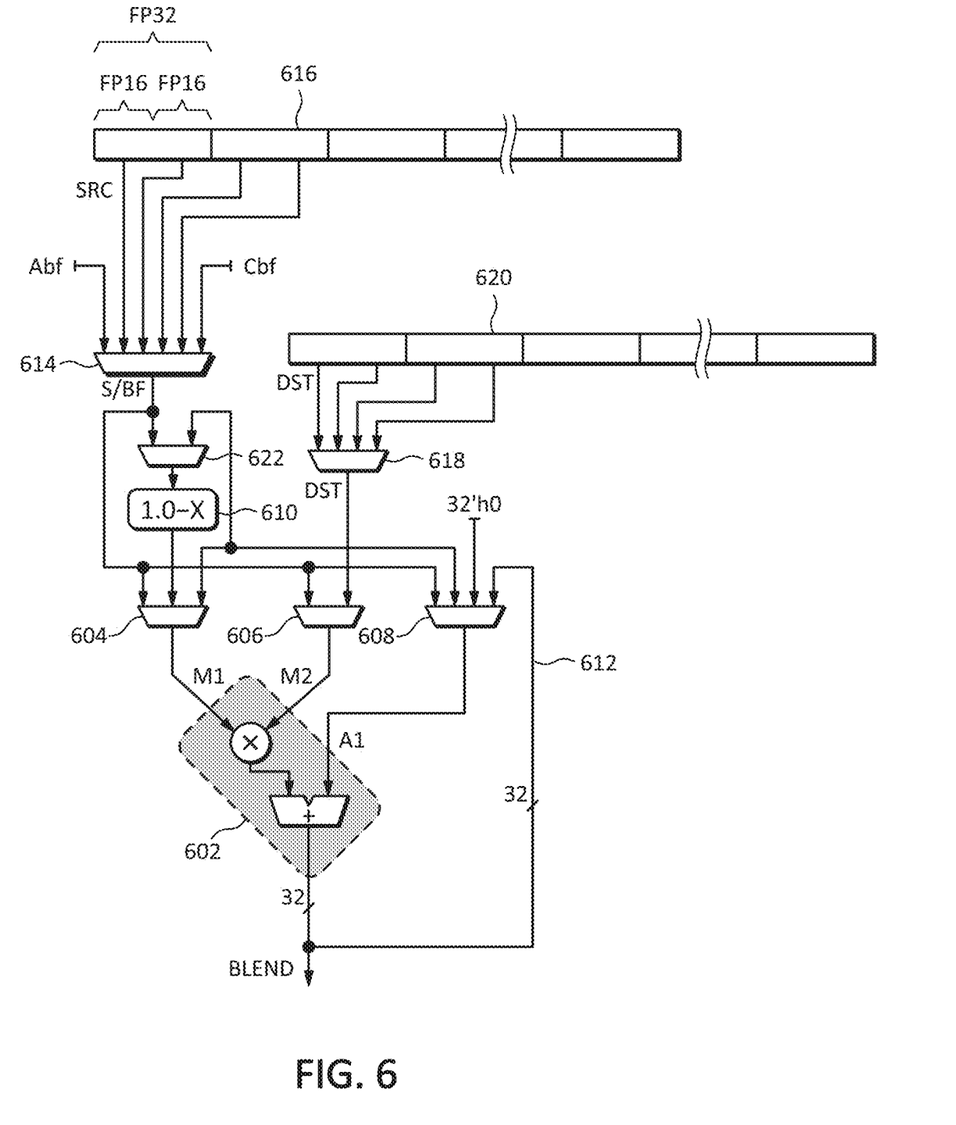
FIG. 6 illustrates an embodiment of blending logic floating point operands according to this disclosure.

FIG. 6 illustrates an embodiment of blending logic for floating point operands according to this disclosure. The embodiment illustrated in FIG. 6 may include a dual-mode floating point multiply-add module 602 which may perform either two 16-bit multiply-add operations or one 32-bit multiply-add operation in the same number of cycles. The multiply-add module 602 may have a first multiply input M1, a second multiply input M2, an add input A1, and a blended output BLEND. The first multiply input M1 may be fed by a multiplexer 604 which may select between source/blend factor data S/BF, destination component data DST, and the output of a 1-X unit 610. The second multiply input M2 may be fed by a multiplexer 606 which may select between the source/blend factor data S/BF and the destination component data DST. The add input A1 may be fed by a multiplexer 608 which may select between the source/blend factor data S/BF, the destination component data DST, a fixed zero input, and a feedback path 612 from the output BLEND of the multiply-add module 602. The output BLEND may be written to a staging buffer such as the output staging buffer 404 shown in FIG. 4.

In some embodiments, the multiply-add module 602 may be implemented, for example, with a fused multiply-add (FMA) module in which the multiplier and adder logic may be integrally constructed such that the intermediate product may not be available. In some embodiments, the overall precision of the result M1*M2+A1 may be based on performing M1*M2 at an effectively infinite precision, then adding A1 at an effectively infinite precision, and performing a single rounding operation at the output. In such an embodiment, a multiplication may be effected by setting A1=0, or an addition may be effected by setting M1=1 or M2=1.

The source/blend factor data S/BF may be provided by a multiplexer 614 which may select between 16-bit or 32-bit source component data SRC from an input register 616, and one or more component blend factors such as Abf, and Cbf. In some implementations and/or applications, Abf may designate a blend factor for an alpha color channel, and Cbf may designate a blend factor for a red, blue, or green color channel, but the embodiment illustrated in FIG. 6 may be used with any type of data, and the A and C designators are only provided as a convenience for distinguishing the different components.

The destination component data DST may be provided by a multiplexer 618 which may select between 16-bit or 32-bit source component data DST from an input register 620.

A multiplexer 622 may be provided to enable the 1-X unit 610 to receive inputs from both of multiplexers 614 and 618 so that any of the SRC, DST, Abf and Cbf values may be applied to the 1-X unit 610. The use of a single 1-X unit may provide an additional enhancement or optimization for the more common cases, for example, when only one or fewer 1-X operations per component may be used. This may enable the cost, area, and/or power consumption of the physical implementation to be reduced. In an uncommon case in which a component involves two 1-X operations, two passes may be made through the logic. However, this may still provide acceptable performance or may even be unnoticeable depending on the implementation details, API programming, and/or the like.

In some other embodiments, however, an additional 1-X unit may be included between the output of multiplexer 618 and a third input to multiplexer 606. Moreover, in such embodiments, blend factors such as Abf and Cbf may be applied as additional inputs to multiplexer 618, thereby eliminating the multiplexer 622.

In operation, if a component of a render target involves both source and destination multiplications, two passes may be made through the multiply-add module 602. If the render operation (equation) has the general form a·b+c·d, the first product, a·b, may be computed on a first pass through the multiply-add module 602 and returned through the feedback path 612. The c·d product and the sum may then be computed on a second pass through the multiply-add module 602. For a component that may only involve a single multiply operation, the feedback path 612 may not be utilized and the operation may proceed in a fully pipelined fashion.

The registers 616 and 620 and multiplexers 614 and 618 may enable the multiply-add module 602 to be kept busy and/or operating at full capacity. For example, in some implementations, due to latency through multiply-add module 602, the result of a first multiplication may not be available until several cycles after presenting the a and b multiplier/multiplicand pair. Thus, to maintain full use of the multiply-add module 602, other data may be presented to it while the first product is computed. Moreover, different render targets may have different formats and different numbers of components. This may lead to some render targets being computed more quickly than others. The registers 616 and 620 and multiplexers 614 and 618 may permit reading various components from different render targets and applying them to the multiply-add module 602. Consequently, there may be data from several pixel components simultaneously passing through the multiply-add module 602 at any given moment.

In some embodiments, the registers 616 and/or 620 may be implemented, for example, as part of the input staging register 402 shown in FIG. 4.

The embodiments illustrated in FIGS. 1-6 may be implemented using any suitable components, for example, circuitry such as combinational and/or sequential logic including multiplexers, switches, latches, flops, registers, gates, inverters, counters, timers, state machines, gate arrays, and/or the like in any suitable form including discrete components, integrated circuits (ICs), programmable logic devices (PLDs), complex programmable logic devices (CPLDs), field programmable gate arrays (FPGAs), application specific integrated circuits (ASICS), and/or the like.

In some embodiments, one or more portions and/or functions of the embodiment may be implemented with a processor executing instructions which may be stored in volatile memory such as dynamic random access memory (DRAM) and/or static random access memory (SRAM), nonvolatile memory such as flash memory, and/or the like.

Although some example embodiments may be described in the context of systems that may use one or more specific data formats and/or numbers of bits, the inventive principles are not limited to these example details, and may be implemented with any other data formats and/or numbers of bits.

Figure 7:
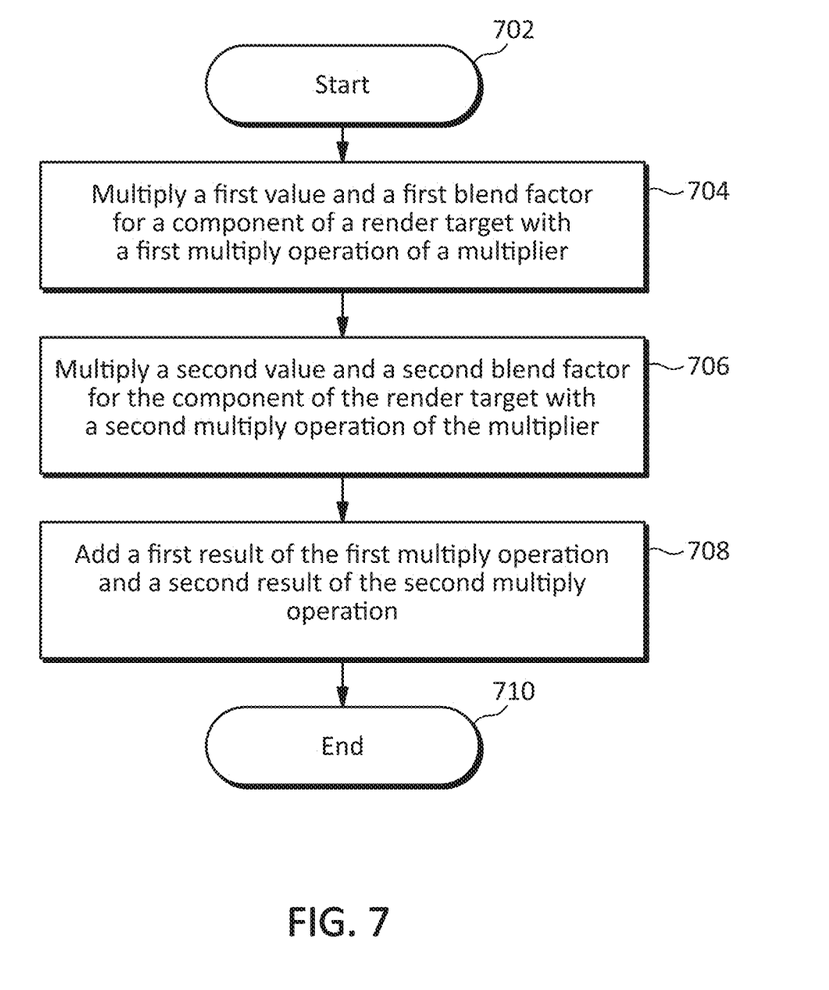
FIG. 7 illustrates an embodiment of a method for performing a blending operation in a graphics processing unit according to this disclosure.

FIG. 7 illustrates an embodiment of a method for performing a blending operation in a graphics processing unit according to this disclosure. The method may start at operation 702. At operation 704, the method may multiply a first value and a first blend factor for a component of a render target with a first multiply operation of a multiplier. At operation 706, the method may multiply a second value and a second blend factor for the component of the render target with a second multiply operation of the multiplier. At operation 708, the method may add a first result of the first multiply operation and a second result of the second multiply operation. The method may end at operation 710.

The operations and/or components described with respect to the embodiment illustrated in FIG. 7, as well as any other embodiments described herein, are example operations and/or components. In some embodiments, some operations and/or components may be omitted and/or other operations and/or components may be included. Moreover, in some embodiments, the temporal and/or spatial order of the operations and/or components may be varied.

Figure 8:
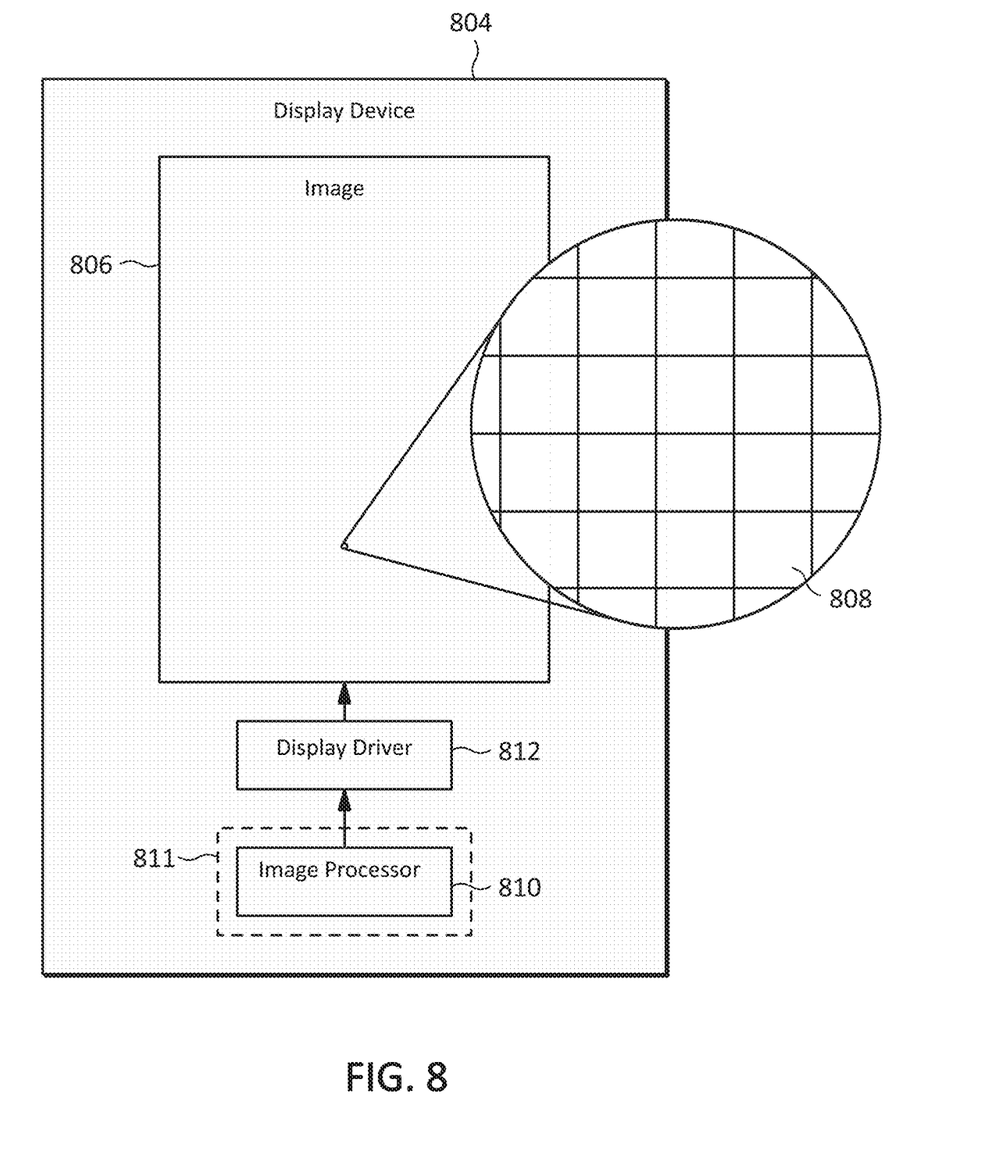
FIG. 8 illustrates an embodiment of an image display device into which any of the methods or apparatus described in this disclosure may be integrated.

FIG. 8 illustrates an embodiment of an image display device 804 into which any of the methods or apparatus described in this disclosure may be integrated. The display device 804 may have any form factor such as a panel display for a PC, laptop, mobile device, etc., a projector, VR goggles, etc., and may be based on any imaging technology such as cathode ray tube (CRT), digital light projector (DLP), light emitting diode (LED), liquid crystal display (LCD), organic LED (OLED), quantum dot, etc., for displaying a rasterized image 806 with pixels. An image processor 810 such as graphics processing unit (GPU) and/or driver circuit 812 may process and/or convert the image to a form that may be displayed on or through the imaging device 804. A portion of the image 806 is shown enlarged so pixels 808 are visible. Any of the methods or apparatus described in this disclosure may be integrated into the display device 804, image processor 810, and/or display driver circuit 812 to generate pixels 808 shown in FIG. 8, and/or groups thereof. In some embodiments, the image processor 810 may include a pipeline that may implement one or more blending operations and/or any of the other inventive principles described herein, implemented, for example, on an integrated circuit 811. In some embodiments, the integrated circuit 811 may also include the driver circuit 812 and/or any other components that may implement any other functionality of the display device 804.

The embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element.

The use of terms such as "first" and "second" in this disclosure and the claims may only be for purposes of distinguishing the things they modify and may not indicate any spatial or temporal order unless apparent otherwise from context. A reference to a first thing may not imply the existence of a second thing. Various organizational aids such as section headings and the like may be provided as a convenience, but the subject matter arranged according to these aids and the principles of this disclosure are not limited by these organizational aids.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method of processing in a graphics processing unit, the method comprising:
   receiving a first value and a first blend factor for a first component of a first render target;
   receiving a second value and a second blend factor for the component of the render target; and
   performing a blending operation for the component of the render target, wherein the blending operation includes:
      multiplying the first value and the first blend factor with a first multiply operation of a first multiplier of a first data path having a first data format;
      multiplying the second value and the second blend factor with a second multiply operation of the multiplier;
      adding a first result of the first multiply operation and a second result of the second multiply operation;
   where the method further comprises:
      multiplying a third value and a third blend factor for a second component of a second render target with a second multiplier of a second data path having a second data format;
      directing the first value and the first blend factor to the first multiplier through a staging register; and
      directing the third value and the third blend factor to the second multiplier through the staging register.

2. The method of claim 1, further comprising bypassing the multiplier for a first blend factor of substantially zero.

3. The method of claim 1, further comprising bypassing the multiplier for a second blend factor of substantially zero.

4. The method of claim 1, further comprising, for a blend factor of substantially one:
   bypassing the multiplier; and
   providing the first value of the component of the render target as a result of the first multiply operation.

5. The method of claim 1, wherein the first result of the first multiply operation is added to the second result of the second multiply operation through a feedback path.

6. The method of claim 1, wherein:
   the first data format comprises a normalized integer format; and
   the second data format comprises a floating point format.

7. An apparatus comprising a graphics processing unit comprising:
   a first multiplier of a first data path having a first data format;
   an input staging register configured to direct a first value and a first blend factor for a first component of a first render target to the first multiplier for a first multiply operation and a second value and a second blend factor for the first component of the render target to the first multiplier for a second multiply operation;
   wherein the first multiplier is configured to multiply the first value and the first blend factor in the first multiply operation, and multiply the second value and the second blend factor in the second multiply operation;
   an adder configured to add a first result of the first multiply operation and a second result of the second multiply operation;
   a second multiplier of a second data path having a second data format, configured to multiply a third value and a third blend factor for a second component of a second render target; and
   wherein the input staging register is further configured to direct the third value and the third blend factor to the second multiplier.

8. The apparatus of claim 7, wherein the input staging register is configured to bypass the multiplier for a first blend factor of substantially zero.

9. The apparatus of claim 8, wherein the input staging register is configured to bypass the multiplier for a second blend factor of substantially zero.

10. The apparatus of claim 7, wherein the input staging register is configured to bypass the multiplier and provide the first value of the component of the render target as the first result of the first multiply operation for a first blend factor of substantially one.

11. The apparatus of claim 10, wherein the input staging register is configured to bypass the multiplier and provide the second value of the component of the render target as the second result of the second multiply operation for a second blend factor of substantially one.

12. The apparatus of claim 7, wherein the first result of the first multiply operation is applied to the adder through a feedback path.

13. The apparatus of claim 7, further comprising an output staging register configured to direct an output of the adder to a buffer.

14. The apparatus of claim 7, wherein:
   the first and second values and the first and second blend factors have a floating point format;
   the multiplier and the adder are configured as a multiply-add module; and
   the input staging register comprises a multiplexer configured to direct floating point data having a first width or floating point data having a second width to a multiply input of the multiply-add module.

15. The apparatus of claim 14, wherein the multiply-add module is configured to perform two floating point multiply-add operations at the first width or one floating point multiply-add operation at the second width in the same number of cycles.

16. The apparatus of claim 14, further comprising a feedback path configured to direct a result output from the multiply-add module to an add input of the multiply-add module.

17. An apparatus comprising a graphics processing unit comprising:

a blending unit comprising blending logic having a first mode and a second mode; and an input staging register configured to direct first data having a first format with a first width to the blending unit in the first mode, and to direct second data having a second format with a second width to the blending unit in the second mode wherein the blending logic comprises:

a layer of multipliers arranged to multiply pairs of the first data in the first mode and pairs of the second data in the second mode;

a first adder arranged to combine outputs from at least one pair of the multipliers to provide a first blended output in the first mode; and a second adder arranged to combine outputs from at least two pairs of the multipliers to provide a second blended output in the second mode.

18. The apparatus of claim 17, wherein the first and second formats comprise unorm, and the second width is larger than the first width.

* * * * *